(12) United States Patent
Mann et al.

(10) Patent No.: US 7,747,375 B2
(45) Date of Patent: Jun. 29, 2010

(54) METHOD FOR OPERATING A HYBRID DRIVE AND DEVICE FOR CARRYING OUT SAID METHOD

(75) Inventors: Karsten Mann, Stuttgart (DE); Markus Hernier, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 746 days.

(21) Appl. No.: 11/629,010

(22) PCT Filed: Jun. 14, 2005

(86) PCT No.: PCT/EP2005/052743

§ 371 (c)(1),
(2), (4) Date: Dec. 6, 2006

(87) PCT Pub. No.: WO2006/010668

PCT Pub. Date: Feb. 2, 2006

(65) Prior Publication Data

US 2008/0091313 A1 Apr. 17, 2008

(51) Int. Cl.
*B60W 20/00* (2006.01)
*G06F 19/00* (2006.01)
(52) U.S. Cl. ............ 701/101; 180/65.21; 180/197
(58) Field of Classification Search .......... 701/101, 701/102, 84, 22, 114, 115; 180/65.01, 65.02, 180/65.04, 197, 65.1, 65.21, 65.28, 65.285, 180/65.31
See application file for complete search history.

(56) References Cited

U.S. PATENT DOCUMENTS

| | | | |
|---|---|---|---|
| 5,327,992 A | 7/1994 | Boll | |
| 5,397,054 A * | 3/1995 | Ziegs | 239/126 |
| 5,841,201 A | 11/1998 | Tabata et al. | |
| 6,054,844 A | 4/2000 | Frank | |
| 6,819,985 B2 | 11/2004 | Minagawa et al. | |
| 7,400,962 B2 * | 7/2008 | Maier-Landgrebe | 701/84 |
| 2007/0240921 A1 * | 10/2007 | Katzenberger et al. | 180/65.2 |

FOREIGN PATENT DOCUMENTS

| | | |
|---|---|---|
| DE | 195 39 571 A1 | 4/1997 |
| DE | 101 48 345 A1 | 4/2003 |
| DE | 101 60 018 A1 | 6/2003 |
| DE | 101 60 480 A1 | 6/2003 |
| DE | 102 03 064 A1 | 8/2003 |
| EP | 1 350 650 A2 | 10/2003 |
| JP | 2003269596 | 9/2003 |
| JP | 2003285657 | 10/2003 |
| JP | 2004197703 | 7/2004 |
| WO | WO 02/078987 A2 | 10/2002 |

* cited by examiner

*Primary Examiner*—Hieu T Vo
(74) *Attorney, Agent, or Firm*—Merchant & Gould P.C.

(57) ABSTRACT

A procedure to operate a hybrid-electric power train and a device to implement the procedure are proposed. The hybrid-electric power train contains at least one internal combustion engine and at least one electromotor, which together supply a drive torque, respectively a driving power output, for a motor vehicle. At a power output demand on the hybrid-electric power train, which corresponds at least to a lower power output threshold, the internal combustion engine is operated constantly at least approximately at the full load.

17 Claims, 2 Drawing Sheets

METHOD FOR OPERATING A HYBRID DRIVE AND DEVICE FOR CARRYING OUT SAID METHOD

Figure 1:
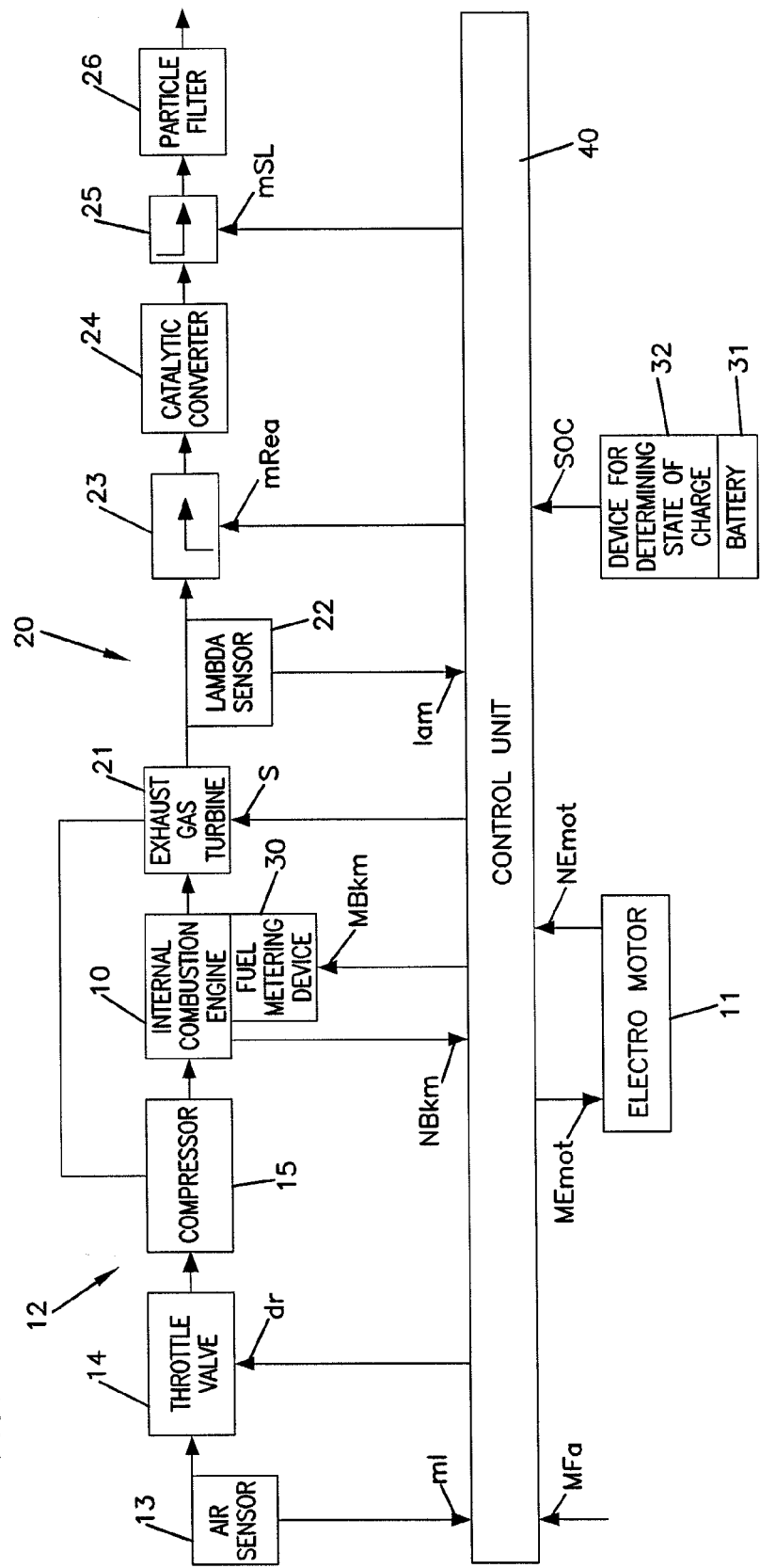

The invention proceeds from a procedure for the operation of a hybrid-electric power train of a motor vehicle, which contains at least one internal combustion engine and at least one electromotor, that together provide a drive torque for the motor vehicle, respectively a driving power output, and a device to implement the procedure according to the class of the independent claims.

From the German patent DE 195 39 571 A1 a hybrid-electric power train was made known, whereby an internal combustion engine and an electromotor are connected with an electrodynamic torque converter. The rotational speed of the internal combustion engine can be raised or lowered with the electromotor. In so doing, the internal combustion engine can be constantly operated in a speed range with the greatest efficiency.

From the German patent DE 101 60 018 A1 a hybrid-electric power train was made known, whereby an optimal rotational speed of the internal combustion engine is forced as a function of the current power output demand on the hybrid-electric power train and as a function of the currently available power output of the hybrid-electric power train by way of a coordinated activation of the internal combustion engine and the electromotor while maintaining the current power output demand.

From the German patent DE 101 48 345 A1 a hybrid-electric power train was made known, whereby at least one electromotor is brought from an optimally efficient operating range as a function of the power output demand on the hybrid-electric power train to an operating state, at which a rapid change in torque of the electromotor can occur.

From the German patent DE 101 60 480 A1 a hybrid-electric power train was made known, whereby provision is made for a coordinated control of the mechanical, electrical and thermal output factors in the entire motor vehicle in order to optimize the energy consumption, comfort, emissions and driveability. On the basis of operating parameters, which correspond particularly to the actual operating conditions of the individual power trains, and subject to the individual driver's preference, an optimal operating state is ascertained for the power train combination at hand.

From the German patent DE 102 03 064 A1 a hybrid-electric power train was made known, whereby the operating point of at least the one electromotor at a specified torque set point and a given actual speed of the motor vehicle are selected in such a fashion, that the sum of the mechanical power output and the electrical attrition of the electromotor is essentially next to naught, so that the electrical energy stores remain uninvolved.

The task underlying the invention is to specify a procedure for the operation of a hybrid-electric power train of a motor vehicle, which contains at least one internal combustion engine and at least one electromotor, that together supply a drive torque for the motor vehicle or a driving power output, and a device for the implementation of the procedure, which allows for a low energy consumption of the hybrid-electric power train and particularly for low emissions.

The task is solved in each case by way of the characteristics specified in the independent claims.

The procedural approach according to the invention for the operation of a hybrid-electric power train of a motor vehicle assumes that the hybrid-electric power train contains at least one internal combustion engine and at least one electromotor, which together supply a drive torque, respectively a driving power output. Provision is made according to the invention, that the internal combustion engine when putting a power output demand on the hybrid-electric power train, which corresponds at least to a lower power output threshold, is constantly operated at a rate at least approaching full load.

The procedural approach according to the invention allows for the operation of an internal combustion engine on the one hand with a high degree of efficiency, so that a lower fuel consumption can be achieved. On the other hand, an elevated exhaust gas temperature emerges by operating the internal combustion engine at full load, which contributes to the heating of the exhaust gas purification devices, which if need be are disposed in the exhaust gas area, so that the energy expenditure for the additionally required heating measures is small or even totally omitted. The elevated exhaust gas emissions before the catalytic converter caused by operating the internal combustion engine at full load, especially the emission of particles, as for example sooty particles, can be energy efficiently removed, so that overall a lower energy demand of the hybrid-electric power train results.

Advantageous configurations and embodiments of the procedural approach result from the dependent claims.

The device according to the invention for the implementation of the procedure concerns a control unit, which is customized to implement the procedure. The control unit especially operates the internal combustion engine constantly at a rate at least approaching full load when a power output demand is being put on the hybrid-electric power train, which corresponds at least to a lower power output threshold.

Provision can be made for a ramified power output hybrid-electric power train to serve as the hybrid-electric power train, which contains at least one internal combustion engine and at least two electromotors, whereby the internal combustion engine as well as both electromotors are connected with each other by way of an infinitely variable transmission.

Provision can also be made for a parallel hybrid-electric power train with an infinitely variable transmission to serve as the hybrid-electric power train. This configuration contains at least one internal combustion engine and one electromotor.

Additional advantageous embodiments and configurations of the procedural approach according to the invention result from additional dependent claims and from the following description.

Figure 2:
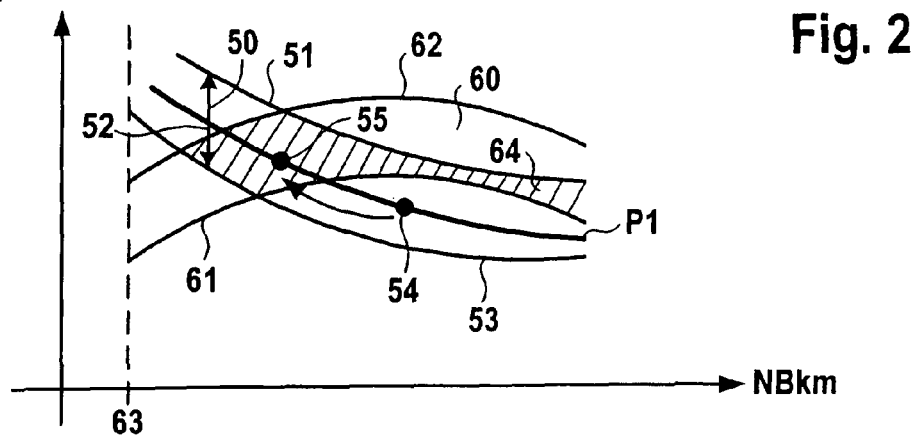
Figure 3:
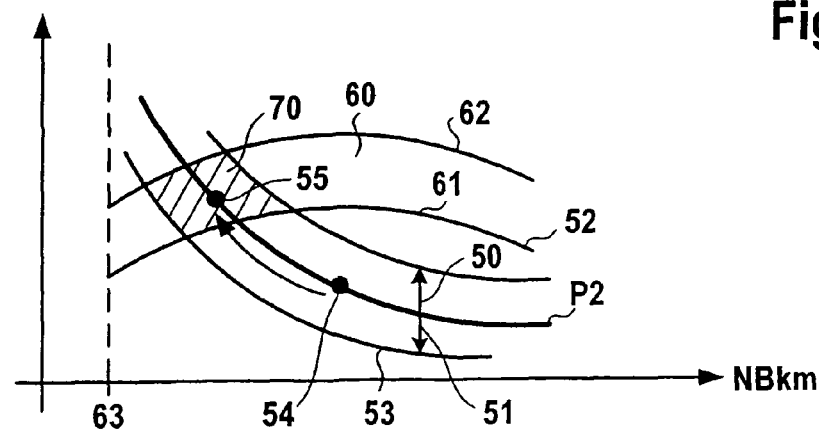
Figure 4:
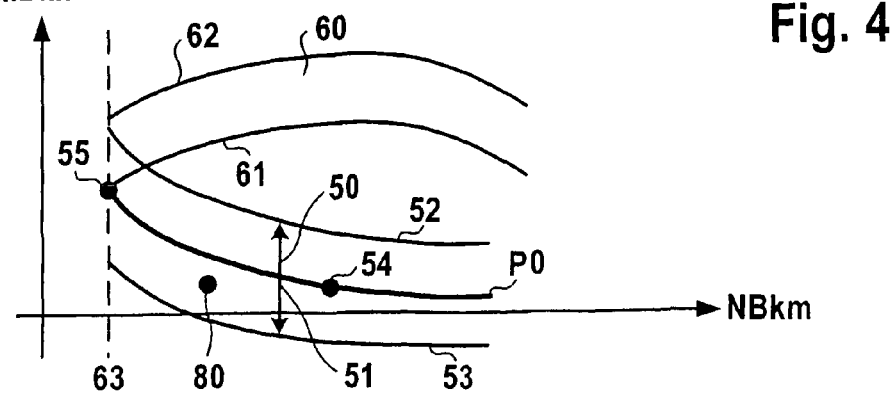

FIG. 1 shows a technical field, in which the procedure according to the invention takes place, and FIGS. 2-4 show characteristic curves as a function of an engine rotational speed.

FIG. 1 shows a hybrid-electric power train of a non-depicted motor vehicle, which contains an internal combustion engine 10 as well as an electromotor 11. In an intake area 12 of the internal combustion engine 10, an air sensor 13, a throttle valve 14 and a compressor 15 are disposed.

In an exhaust area 20 of the internal combustion engine 10, an exhaust gas turbine 21, a lambda sensor 22, a device to introduce a reagent substance 23, a catalytic converter 24, a device to introduce secondary air 25 as well as a particle filter 26 are disposed. The connection described in FIG. 1 between the exhaust gas turbine 21 and the compressor 15 indicate that both components are mechanically in connection with each other. They comprise together an exhaust gas turbo charger.

A fuel metering device 30 is attached to the internal combustion engine 10, and a device to determine the state of charge 32 is attached to a battery.

The air sensor 13 transmits an air signal m1 to a control unit 40, the internal combustion engine 10 an engine rotational speed NBkm, the lambda sensor 22 a lambda signal lam, the electromotor 11 a motor rotational speed NEmot and the device to determine the state of charge 32 a state of charge signal SOC. The control unit 40 is, furthermore, supplied with a torque set point MFa.

The control unit 40 transmits a throttle valve signal dr to the throttle valve, an engine torque signal MBkm to the fuel metering device 30, a control signal S to the exhaust gas turbine 21, a reagent substance metering signal mRea to the device to introduce the reagent substance 23, a secondary air metering signal mSL to the device to introduce secondary air 25 as well as an electromotor torque signal MEmot to an electromotor 11.

FIG. 2 shows an initial power output hyperbola P1 plotted versus the engine rotational speed NBkm, which can be raised by an amount of increase 50 to an upper limit hyperbola 51 or lowered by an amount of reduction 52 to a lower limit hyperbola.

An initial power output set point 54 is plotted on the initial power output hyperbola P1, which can be displaced to a second power output set point 55.

Furthermore, a full load range 60 of the internal combustion engine 10 is plotted versus the engine rotational speed NBkm, which is limited by a lower full load limit 61 and an upper full load limit 62. The full load range 60 ends at a lower rotational speed limit 63 of the engine rotational speed NBkm.

A first sampling range, which is indicated by hatching, is bounded by the upper full load limit 62, the upper limit hyperbola 51, the lower full load limit 61, the lower limit hyperbola 53 as well as if need be by the lower engine rotational speed limit 63.

The load state of the internal combustion engine 10 corresponds at least approximately to the engine torque MBkm, which, therefore, is added next to the power output P as an ordinate designation.

FIG. 3 shows a second power output hyperbola P2 plotted versus the engine rotational speed NBkm. Those parts shown in FIG. 3, which correspond to those in FIG. 2, bear in each case the same reference numbers. The power output underlying the second power output hyperbola P2 is less than that of the initial power output hyperbola P1. A second sampling range 70 results from the reduction, which is smaller than the first sampling range 64.

FIG. 4 shows a third power output hyperbola, which corresponds to a lower power output threshold P0, plotted versus the engine rotational speed NBkm. Those parts in FIG. 4, which correspond to those shown in FIG. 2, bear in each case again the same reference designations. The second plotted power output set point 55, which lies on the lower power output threshold P0, has a point of intersection with the lower full load limit 61, which lies at the lower engine rotational speed limit 63 of the engine rotational speed NBkm. A sampling range does not emerge in FIG. 4. A third power output set point 80, which is plotted, lies beneath the lower power output threshold P0.

We will proceed in the following way according to the invention:

The hybrid-electric power train shown in FIG. 1 contains at least the one internal combustion engine 10 and at least one electromotor 11, which together produce a torque, respectively a driving power output, for a non-depicted motor vehicle. Provision is made in a preferred embodiment for a hybrid-electric power train with a ramified power output, which contains at least the internal combustion engine 10 and at least 2 electromotors 11, whereby all of the power trains are connected with each other by way of an infinitely variable transmission. In such a case of a hybrid-electric power train with a ramified power output, an electromotor can yield a torque to drive the motor vehicle, while the other electromotor supplies the energy to charge the battery. Via the infinitely variable transmission, the rotational speed contributions of the individual power trains can be established infinitely variable. Another possibility for the realization of an optional rotational speed contribution of the individual power trains was made known by way of the state of the art named at the beginning of the application, whereby the rotor of the electromotor 11 works in conjunction with a stator, which is disposed on the output shaft of the internal combustion engine 10.

The hybrid-electric power train must supply altogether a torque set point MFa, which is desired by the driver of a motor vehicle, and which at least corresponds approximately to an accelerator pedal position. At a specified engine rotational speed the torque set point MFa corresponds to a power output. The points which are in each case of constant power output generate the power output hyperbolas P1, P2 shown in the FIGS. 2-3, respectively the lower power output threshold P0 shown in FIG. 4.

Provision is made according to the invention, that the internal combustion engine 10 be operated constantly at a rate which is at least approximately full load, when a power output demand is placed on the hybrid-electric power train, which corresponds to at least the lower power output threshold displayed in FIG. 4. The full load of the internal combustion engine is given by the characteristic curve of maximum torque, which is dependent upon the rotational speed of the engine. Instead of the maximum torque, provision can be made for a maximally allowed amount of fuel supplied to the engine per piston stroke or for another operating parameter of the hybrid-electric power train or of the internal combustion engine 10.

An advantageous configuration of the procedural approach according to the invention makes provision for the full load of the internal combustion engine 10 to be varied. According to those examples of embodiment underlying those of FIGS. 2-4, the full load of the internal combustion engine 10 can be varied between the lower and upper full load limit 61, 62, so that the full load spans the full load range 60.

A first possibility to vary the full load 60, 61, 62, which is especially suited to diesel internal combustion engines, is provided for by a throttling of the air intake of the diesel internal combustion engine 10. The throttling is accomplished by a throttle valve 14 which is disposed in the air intake area 12. The valve is controlled by a control unit 40 with the throttle valve signal dr.

An additional or alternative possibility to vary the full load 60, 61, 62, which is also particularly suited to diesel internal combustion engines, is provided for by an activation of the exhaust gas turbine 21 with the control signal S. The exhaust gas turbine 21, which has preferably a shovel geometry, constitutes together with the compressor 15 an exhaust gas turbo charger of a variable compression output.

It is possible in principle, to influence the full load 60, 61, 62 of the internal combustion engine 10 additionally or alternatively by a change of the fuel amount. As the fuel amount is at least approximately proportional to the desired engine torque MBkm, the activation of the fuel metering device 30 was entered as the engine torque MBkm according to FIG. 1.

According to a preferred configuration, the amount of air is determined in such a way, that the measured air number lambda in the exhaust gas is established at a value of at least approximately 0.9 to 1.3. The air number which is adjusted in such a way corresponds to a combustion state in the combustion chamber of the internal combustion engine 10, which is similar to full load.

A falling below a lambda value of 1.0 leads to an increased emergence of unburned fuel components in the exhaust gas, which can be taken into consideration for various measures. Provision is made in a first measure for the heating of the at least one catalytic converter, which is designated for the exhaust gas area 20, and/or the at least one particle filter 26. The heating can thereby be realized, in that the fuel components react exothermally with the residual oxygen present in the exhaust gas, particularly on the catalytic surface areas. Such a catalytic surface is present in any case in the catalytic converter 24. The particle filter 26 can be lined with a corresponding catalytic surface. As long as the conditions suffice for a thermo-reaction in the exhaust gas area 20, the unburned fuel components contribute to a heating up of the exhaust gas, which indirectly heats the catalytic converter 24 and/or the particle filter 26.

Another reason for the specification of the air number lambda to a value smaller than 1 lies in the fact, that the unburned fuel components in the exhaust gas can be taken into consideration for a regeneration of a catalytic converter, which has been configured as a storage catalytic converter. The fuel components operate in this instance as a reagent substance.

In establishing the air number lambda, consideration must be given to the fact, that diesel internal combustion engines in particular are operated with a large surplus of air. In establishing the air number lambda at least approximately 1.0, a considerable increase in the particle emissions, especially those of sooty particles, must eventually be taken into account. It can, therefore, be very advisable, to establish the air number lambda at a value greater than 1, for example maximally at 1.3.

A particularly advantageous configuration of the procedural approach according to the invention provides for the air number lambda to be established at a value of at least approximately 0.97 to 1.05. This comparatively narrow range of the air number lambda is designed to transform the emissions emitted before the catalytic conversion process into non-toxic combinations within a conventional 3-way-catalytic converter. Such a 3-way-catalytic converter is mass produced and is for this reason obtainable at a reasonable price. The establishment of the air number lambda within the range from 0.97 to 1.05 is not to be seen as strictly established within this range. This range is rather to be brought into alignment with the conversion window of the respectively deployed 3-way-catalytic converter and must if need be for this reason be extended slightly upward or downward.

As far as the setting of the air number lambda at a higher lambda value is concerned because establishing it at least approximately at 0.97 to 1.05 with regard to the exhaust gas emissions before the catalytic converter of the internal combustion engine 10, particularly the particle emissions, is not reasonable, the configuration can nevertheless fall back on conventional 3-way-catalytic converters. The specified limit of the lambda value of 1.3 is likewise not to be considered fixed and can be varied in each case with regard to the existing conditions. In order to achieve the optimal conversion window of the 3-way-catalytic converter, the air number lambda in the exhaust gas of the internal combustion engine must by way of the introduction of a reagent substance either within the engine or after engine as shown in the example of embodiment be brought to the required measure. Provision is made in the example of embodiment shown for the additional introduction of the reagent substance by a reagent substance introduction device 23. Preferably the reagent substance is fuel. The metering of which is performed by the control unit 40 by way of the metering signal mRea, which, for example, determines the opening cross-sectional width of a non-depicted metering valve or a metering pressure.

The existing increased exhaust gas temperature resulting from the at least approximate operation of the internal combustion engine 10 at full load 60, 61, 62 is drawn upon advantageously to heat the particle filter 26. The particle filter 26 is disposed especially in the exhaust gas area 20 of a diesel internal combustion engine 10 for the removal of the particle emissions. No special measures are required during the particle inclusion phase. A regeneration of the particle filter 26 results from the raising of the temperature in the particle filter to a value of, for example, 550 degrees Celsius to 650 degrees Celsius. An exothermic reaction begins at this temperature, whereby the particles combust. Provided that sufficient oxygen is available by means of a suitable establishment of the air number lambda in the exhaust gas of the internal combustion engine 10 to a value of at least approximately 1.0 or higher, the reaction starts by itself when the lower temperature limit is reached. If need be the delivery of oxygen may be required. The secondary air introduction device 25 is designed for this purpose, which is activated by the control unit 40 via the secondary air metering signal mSL.

Amid the conditions displayed in FIG. 2, a trouble-free displacement of the plotted power output set point 54 may occur on the first output hyperbola P1 in such a manner, that the second plotted power output set point 55 comes to rest within the full load range 60. Preferably the second plotted power output set point 55 is placed at least approximately in the middle of the full load range. With this action the full load 60, 61, 62 of the internal combustion engine 10 can be simply adjusted by providing the maximum amount of distance from the lower full load limit 61 as well as from the upper full load limit 62.

A change in the power output demand does not necessarily mean a new establishing of the full load 60, 61, 62 of the internal combustion engine 10. With at least the one electromotor 11 it is possible, to realize a change in output at a second firmly fixed plotted power output set point.

The power output can be increased by the amount of increase 50, whereby the maximum amount of increase 50 depends on the maximum possible power output of the electromotor 11.

Preferably at least the one electromotor 11 can work in the generator mode, in order, for example, to charge the battery 31. The electromotor 11 consumes power output during the operation in this mode, so that the power output can be reduced by the amount of reduction 51 when compared to the power output hyperbola P1. The maximum amount of reduction 51 depends upon the maximum power output consumption of the electromotor 11.

While adhering to a second plotted power output set point 55, the working point of the entire hybrid-electric power train can lie within the first sampling range 64 by way of a variation of the power output of at least the one electromotor 11. This sampling range is bounded by the upper full load limit 62 of the internal combustion engine 10, the upper limit hyperbola 51, the lower full load limit 61 of the internal combustion engine 10 as well as the lower limit hyperbola 53. If a change in the full load 60, 61, 62 of the internal combustion engine 10 is additionally allowed, the first sampling range 64 can be correspondingly enlarged or reduced.

Within the first sampling range 64, an optimization in regard to the entire power output requirement of the internal combustion engine 10 as well as the electromotor 11 can take place, and/or in regard to the fuel consumption of the internal combustion engine 10, and/or in regard to the exhaust gas emissions before the catalytic converter of the internal combustion engine 10, and/or in regard to the charging state of the battery 31, and/or in regard to the number of cycles, respectively cycle depth of the battery 31.

The charging state of the battery 31 is constantly ascertained by the charging state recognition 34 and made available to the control unit 40 via the charging state signal SOC.

In the example of embodiment underlying FIG. 3 the power output demand on the hybrid-electric power train is smaller than that of the example of embodiment, which underlies FIG. 2. The second power output hyperbola P2 lies, therefore, farther away from the selectable full load range 60 of the internal combustion engine 10. Overall the second sampling range 70 is for this reason constricted in comparison to the first sampling range 64. The working point of the entire hybrid-electric power train can also in this operating situation be established within the second sampling range 70. Preferably the full load 60, 61, 62 of the internal combustion engine 10 is again placed at least approximately in the middle between the upper and lower full load limit 61, 62.

The lower power output threshold P0 depicted in FIG. 4, corresponding to the third power output hyperbola, has only one point of intersection with the lower full load limit 61 of the internal combustion engine 10, which lies at the lower engine rotational speed limit 63. The initial plotted power output set point 54 can in this operating situation only be displaced to the point of intersection, which corresponds to the second plotted power output set point. A sampling range 64, 70 is omitted. A possibility to vary the full load 60, 61, 62 of the internal combustion engine 10 is no longer possible in this operating position.

Furthermore, in the example of embodiment depicted in FIG. 4 a third power output set point 80 is plotted, which lies beneath the lower power output threshold P0. At a power output demand on the hybrid-electric power train lying under the lower power output threshold P0, as is the case at the third plotted power output set point 80, the internal combustion engine 10 can no longer be operated at full load 60, 61, 62. In this situation the entire driving power output is supplied by at least one electromotor 11. When the advantages attainable with the procedure according to the invention have been abandoned by operating the internal combustion engine 10 beneath the lower full load limit 61, the internal combustion engine 10 can also deliver a power output contribution in this operating situation.

The invention claimed is:

1. An apparatus for operating a motor vehicle including an internal combustion engine, an electromotor, a power train, and a control unit, wherein the control unit is constructed and configured to operate the internal combustion engine above a minimum rotational speed constantly at approximately full load between a lower full load limit and an upper full load limit when a power demand is placed on the power train corresponding to at least a lower power output threshold of the power train.

2. The apparatus according to claim 1, wherein the power train is a ramified power output hybrid-electric power train that serves as the hybrid-electric power train, which contains one internal combustion engine and at least 2 electromotors, whereby the internal combustion engine as well as both electromotors are connected by way of an infinitely variable transmission.

3. The apparatus according to claim 1, wherein the power train is a parallel hybrid-electric power train, which contains at least one internal combustion engine and at least one electromotor that serves as the hybrid-electric power train; and that provision is made for a continuous transmission to serve as the transmission.

4. A method of operation of a hybrid-electric power train of a motor vehicle, which has at least one internal combustion engine and at least one electromotor that provide a drive torque for the motor vehicle, the method including:
(a) operating the internal combustion engine above a minimum rotational speed constantly at approximately full load between a lower full load limit and an upper full load limit, when a power output demand is placed on the hybrid-electric power train corresponding to at least a lower power output threshold of the power train.

5. The method according to claim 4, wherein the full load is varied.

6. The method according to claim 5, wherein the full load is established by a throttling of the intake air.

7. The method according to claim 5, wherein the full load is established by an activation of an exhaust gas turbo charger.

8. The method according to claim 5, further comprising establishing an air number lambda in an exhaust gas of the internal combustion engine at a value of at least approximately 0.9 to 1.3.

9. The method according to claim 5, further comprising establishing an air number lambda in an exhaust gas of the internal combustion engine at a value of at least approximately 0.97 to 1.05.

10. The method according to claim 5, wherein the full load is established approximately in the middle between the lower and upper full load limit.

11. The method according to claim 4, further comprising providing at least one catalytic converter or one particle filter in an exhaust gas area of the internal combustion engine.

12. The method according to claim 11, further comprising establishing an air number lambda in an exhaust gas of the internal combustion engine at a value, which at least approximately is brought into alignment with an optimal conversion range of the catalytic converter.

13. The method according to claim 11, further comprising designing the catalytic converter as a storage catalytic converter and establishing an air number lambda in an exhaust gas of the internal combustion engine at a value required for regeneration of the catalytic converter.

14. The method according to claim 11, further comprising introducing a reagent substance or a raw material of a reagent substance upstream from the catalytic converter.

15. The method according to claim 14, wherein the reagent substance is fuel.

16. The method according to claim 11, further comprising injecting secondary air upstream from the particle filter.

17. A method according to claim 4, wherein the power output of the power train is produced only by the at least one electromotor, when the power output demand on the hybrid-electric power train is lower than the lower power output threshold.

* * * * *